United States Patent Office 3,410,104
Patented Nov. 12, 1968

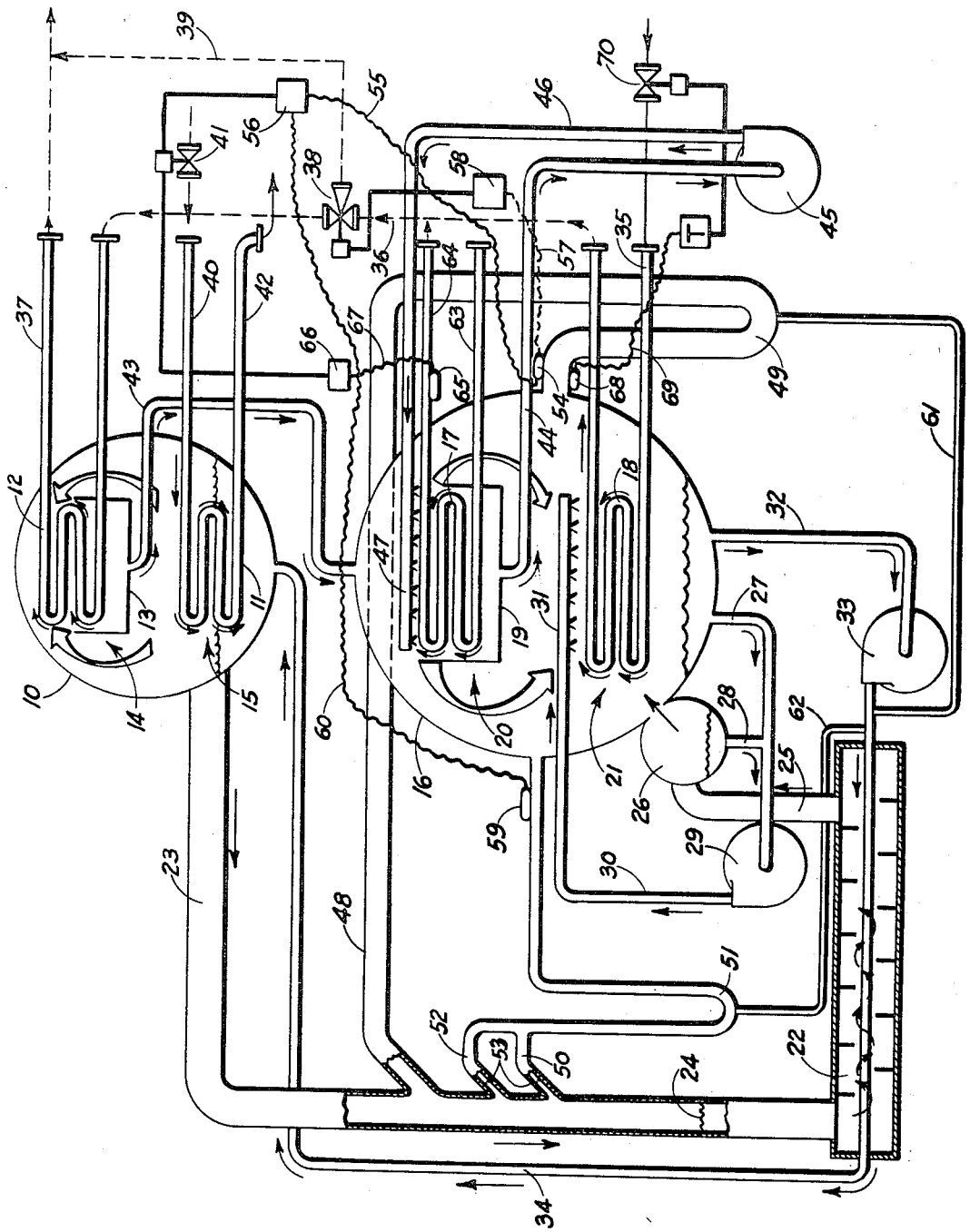

3,410,104
ABSORPTION REFRIGERATING SYSTEMS
Neil E. Hopkins, Spring Garden Township, York County, Pa., assignor to Borg-Warner Corporation, Chicago, Ill., a corporation of Illinois
Continuation of application Ser. No. 169,969, Jan. 30, 1962. This application Dec. 24, 1964, Ser. No. 442,562
18 Claims. (Cl. 62—148)

ABSTRACT OF THE DISCLOSURE

An absorption refrigeration machine which includes a bypass line around the solution heat exchanger to automatically divert solution flowing from the generator directly to the absorber in the event crystallization blocks flow through the solution heat exchanger. Suitable controls are also provided which sense the flow of solution passing through the bypass line to automatically initiate corrective action.

---

This application is a continuation of U.S. application Ser. No. 169,969, filed on Jan. 30, 1962, now abandoned.

This invention relates to absorption refrigerating systems and, more particularly, to a means and method to prevent crystallization of the solution therein, to decrystallize the solution in the event of crystallization, and to operate even though crystallized.

In the average absorption system of the type using lithium bromide or some other suitable salt solution, hot, strong solution (concentrated) flows from the generator of the apparatus to the absorber, while cool, weak solution (dilute) flows from the absorber to the generator. A heat-exchanger is provided in the two lines so that the hot, strong solution, en route to the absorber, may give up its heat to the cool, weak solution flowing to the generator. At such times as the apparatus may not be operating at full capacity (due to air leakage, for example), it is possible that the solution leaving the generator may be too high in concentration, in that the so-called "weak" solution forwarded to the generator for regeneration will not have been diluted by the refrigerant to the extent normally occurring. The weak solution being higher in concentration of the particular salt utilized will result in the "strong" solution being higher in concentration. Whereupon, on being cooled down in the aforementioned heat-exchanger, some of the lithium bromide (or other salt utilized) may crystallize out. If it is allowed to continue, the entire flow passage through the heat-exchanger for the "strong" solution may become blocked and the flow therethrough of the strong solution necessarily impeded. The herein-disclosed invention is directed to the prevention of the aforementioned crystallization, to a method of decrystallization in the event of crystallization, and to a method whereby operation may be continued in the event of crystallization.

In Patent No. 2,986,906 a method is disclosed for bypassing strong solution around a crystallized heat-exchanger, wherein a hot solution bypass line is provided between the generator and the absorber, and wherein the inlet to the bypass line at the generator is at a level above the normal level of solution within the generator. At such time as the heat-exchanger may be crystallized sufficiently to impede the flow of hot solution therethrough, then the normal level of solution in the generator gradually rises, since the flow of weak solution from the absorber to the generator continues. At such time as the solution rises to the level of the bypass line from the generator to the absorber, then the hot solution flows directly to the absorber bypassing the generator. When normal flow is restored, the level in the generator drops below the bypass line and no flow through the bypass line takes place. While this method has proven satisfactory in operation, nevertheless it is subject to several deficiencies: (1) It is inoperative until such time as crystallization has occurred sufficient to raise the entire level of solution in the generator; (2) While it is useful as a decrystallization method, it is inoperative to prevent crystallization in the first instance; (3) Because the entire level of solution in the generator must rise, it is not sufficiently sensitive; and (4) It cannot decrystallize a heat-exchanger where high concentrations are involved.

Applicant has devised a method which, while retaining the advantages of the aforesaid patented method, does away with the disadvantages. Applicant provides a line for the flow of hot, strong solution from the generator to the heat-exchanger, which line is sized sufficiently large to maintain a predetermined level of solution therein and open sewer flow above the predetermined level. At a selected height above the aforementioned predetermined level of solution, a bypass line joins the hot solution line directly to the generator. As soon as sufficient crystallization within the heat-exchanger has occurred to back up the solution within the hot solution line, then it will flow into the bypass line and directly to the absorber. Further, a control may be provided subject to flow of hot solution through the bypass line to throttle down on the steam supply to the generator to decrease the concentration of the hot solution, or, alternatively, to cut down on the cooling water supplied to the condenser, producing the same effect. In addition, one or more limited capacity overflow lines may be connected to the hot solution line at various points between the predetermined level of solution therein and the level at which the bypass line joins the hot solution line. On a slight amount of crystallization, which would have the effect of slightly impeding the flow of hot solution through the heat-exchanger and a slight rising of the normal level of solution within the hot solution line, flow will occur through a first overflow line. Means are then provided which are activated by the just-mentioned flow to throttle down on the steam supply line to the generator, thereby decreasing the concentration of the hot solution. Should the level within the hot solution line continue to rise, then a second limited capacity overflow could be provided, which could operate to further cut back on the steam supply to still further cut down on the concentration of the hot solution. (It will be apparent that any other control could be actuated, as desired, to produce the same effect.) With a continued increase in the level of solution, indicating an almost completely crystallized heat exchanger, a level is reached wherein the hot solution flows through the aforementioned bypass line directly to the absorber in order to continue the operation of the apparatus and to decrystallize the heat-exchanger. It will be apparent that as many steps of control as may be desired can be provided in the process of quantitatively bypassing the heated solution directly to the absorber. Further, means may be provided for discontinuing the operation of the apparatus entirely, and for automatically decrystallizing the heat-exchanger in the event of complete blockage of flow through the heat-exchanger.

It is an object of the invention to provide an absorption refrigerating system, including a generator, an absorber and a heat-exchanger for exchanging heat between strong solution flowing from the generator to the absorber and weak solution flowing from the absorber to the generator, wherein means are provided for bypassing the strong solution around the heat-exchanger when the flow therethrough is impeded to any chosen degree. A further object is to provide a system of the type just above-mentioned, wherein control means are provided responsive to the flow of strong solution through the bypass means. The control means may actuate valve means regulating the flow of heated fluid to the generator, and valve means regulating the flow of cooling fluid to the absorber. Another object is to provide a system of the type first above-mentioned, including a condenser and control means responsive to the flow of strong solution through the bypass means for actuating valve means controlling the flow of cooling fluid through the condenser or the flow of heated fluid to the generator. Still another object is to provide a system of the type just above-mentioned, wherein the control means additionally regulate the flow of cooling fluid to the absorber.

Yet another object of the invention is to provide an absorption refrigerating system, including a generator, an absorber and a heater-exchanger for exchanging heat between strong solution flowing from the generator to the absorber and weak solution flowing from the absorber to the generator, and wherein control means are provided responsive to the impediment of flow of strong solution through the heat-exchanger to lower the concentration of said strong solution. A further object is to provide an absorption refrigerating system of the type just above-mentioned, wherein bypass means are provided for bypassing strong solution around the heat-exchanger should the impediment to flow through the heat-exchanger progressively be increased. A still further object is to provide a system of the type just above-mentioned, wherein said control means operates to discontinue the flow of cooling water to the absorber in the event of continued impediment.

The invention consists of the novel constructions, arrangements and devices to be hereinafter described and claimed for carrying out the above-stated objects and such other objects as will appear from the following description of a preferred embodiment of the invention described with reference to the accompanying drawing, in which:

The figure is a schematic representation of an absorption refrigerating system embodying the instant invention.

Turning now to the figure, a shell 10 is provided having therein a heat-exchanger 11 and a heat-exchanger 12. A pan 13 is provided below heat-exchanger 12 and combines therewith to form a condenser 14. Heat-exchanger 11 cooperates with shell 10 to form a generator 15. Below shell 10, a shell 16 is provided having therein a heat-exchanger 17 and a heat-exchanger 18. Heat-exchanger 17 is provided with a pan 19, which combines therewith to form an evaporator 20. Heat-exchanger 18 cooperates with shell 16 to form an absorber 21. A solution heat-exchanger 22 is provided for purposes which will be apparent hereinafter. A pressure differential exists between shells 10 and 16, corresponding to condenser pressure and evaporator pressure of the refrigerant. Suitable means (not shown) are provided to maintain the pressure differential between the shells.

For the purpose of this specification, "strong" solution will be solution of higher concentration in lithium bromide (approximately 64.5%), while "weak" solution is defined as solution lower in concentration of lithium bromide (approximately 59.5%). The aforementioned generator heats solution received to drive off refrigerant therein (water) and the "strong" solution is then flowed to the absorber to absorb refrigerant therein. After it has absorbed the refrigerant, the then "weak" solution is forwarded to the generator for regeneration.

A hot, strong solution line 23 leads from shell 10 to heat-exchanger 22. Line 23 is sized sufficiently large so that, in the normal flow of solution from the generator to the heat-exhanger, a predetermined hot solution level is established at a point such as 24 with open sewer flow thereabove, all for purposes which will later become obvious.

A cool, strong solution line 25 leads from heat-exchanger 22 to a flash chamber 26 in communication with shell 16, whereby the pressures in the flash chamber and shell are equalized. Weak solution which accumulates at the bottom of shell 16 flows into a line 27 and mixes with strong solution flowing from flash chamber 26 by way of a line 28. The mixture is then forwarded by a solution pump 29 into a line 30 terminating in a spray-header 31 over absorber 21. A line 32 leads from shell 16 to heat-exchanger 22 and has a pump 33 therein. A weak solution line 34 joins heat-exchanger 22 with shell 10.

A line 35 leads cooling water from any suitable source to heat-exchanger 18 of absorber 21. A crossover line 36 is provided, which then forwards the cooling water to heat-exchanger 12 of condenser 14, wherein it acts to pick up heat from the refrigerant flowing thereover. The water exits heat-exchanger 12 by way of a line 37. An automatic 3-way valve 38 is connected into crossover line 36 to bypass cooling water around condenser 14 by way of a line 39.

A steam inlet line 40, having an automatic valve 41 therein, provides steam to heat-exchanger 11. A suitable condensate outlet line 42 leads condensate from heat-exchanger 11. A liquid refrigerant line 43 leads from pan 13 to heat-exchanger 17 of evaporator 20. A refrigerant line 44 leads from pan 19 of evaporator 20 to a pump 45 from whence it is pumped by way of a line 46 through a spray-header 47 to the aforementioned heat-exchanger 17 for recirculation purposes.

At a selected height above the solution level 24 within hot solution line 23, a bypass line 48 is provided leading from line 23 and directly into shell 16 by way of a U-tube portion 49. A first limited capacity overflow line 50 is provided in line 23 at a point intermediate the intersection of line 48 and the liquid level 24 of solution within hot solution line 23. Line 50 leads directly into shell 16 by way of a U-tube portion 51. A second limited capacity overflow line 52 is connected in line 23 at a level intermediate line 50 and the intersection of line 48 with line 23, and joins with line 50. Lines 50 and 52 each have limited capacity, by restrictors 53 or line sizing. A control bulb 54, located on bypass line 48 adjacent shell 16, is connected by way of a capillary 55 to a control 56 for steam valve 41. Alternatively, bulb 54 is connected by way of a capillary 57 to a control 58 for the cooling water bypass valve 38.

A control bulb 59, located on limited capacity overflow line 50 adjacent shell 16, is also connected by way of a capillary 60 to control 56 for steam valve 41. It is apparent that bulb 59 could be connected operatively to control 58 for cooling water bypass valve 38. It will be further apparent that bulbs 54 and 59 could be utilized to control various and sundry mechanisms. I do not exclude this possibility.

A bleeder line 61 and a bleeder line 62 are provided between weak solution line 32 and the U-tube portion 49 to line 48 and the U-tube portion 51 of line 50 respectively, in order that, in normal operation, weak solution may fill both trapped lines, as shown in the drawing, to prevent vapor blowthrough between shells 16 and 10.

A line 63 is provided for leading any heat-exchange fluid, which it is desired to chill, to evaporator 20. The fluid exits evaporator 20 by way of a line 64 en route to whatever device or apparatus it is desired.

A control bulb 65 is located on exit line 64 and is operatively connected to a control 66 by way of a capillary 67. Control 66 acts to regulate the steam supply to generator 15 in accordance with the temperature of the chilled heat-exchange fluid.

If desirable, a second bulb 68 may be located on bypass line 48 at a point close to its entrance into shell 16. A capillary 69 connects bulb 68 to a timed control T, which acts to close a valve 70 in cooling water line 35 to the absorber 21.

As is customary, heat-exchanger 22 is of the shell and tube type with the weak solution en route from the absorber to the generator flowing within the tubes, and the strong solution flowing from the generator to the absorber flowing over the tubes within the shell.

Operation

In operation, heat-exchange fluid supplied to evaporator 20, by way of line 63, gives up its heat to refrigerant flowing thereover and exits by way of line 64. In absorbing the heat given up by the heat-exchange fluid, the refrigerant is vaporized and is absorbed by the strong solution flowing over absorber 21. Cooling water is circulated through the absorber heat-exchanger 18 by way of line 35 to remove the heat liberated in the absorption process. Thus, as the strong solution flowing over the absorber absorbs refrigerant therein, it becomes less concentrated and eventually flows to the bottom of shell 16 whence it is picked up by pump 33 for flow to generator 15 for regeneration. Steam, supplied by way of line 40 to generator heat-exchanger 11, drives the refrigerant out of the solution in contact with the generator. The vaporized refrigerant flows over condenser 14, giving up its heat to the cooling fluid flowing through condenser heat-exchanger 12 by way of crossover 36 from absorber 21. The condensed refrigerant then flows through line 43 to evaporator 20 to complete the cycle.

Hot solution accumulates on the bottom of shell 10 and flows via line 23 to heat-exchanger 22. In the heat-exchanger the strong solution flowing on the shell side exchanges heat with the cooler weak solution flowing within the tubes and the then cool strong solution flows through line 25 to flash chamber 26. From flash chamber 26 the solution flows through line 28, whence it is picked up by pump 29 and mixed with solution flowing through line 27. The mixture is then forwarded via line 30 to spray-header 31 and over absorber 21.

If crystallization occurs during operation, it normally crystallizes on the shell side of heat-exchanger 22. This is a progressive process. Initially, with a small amount of crystallization building up around the tubes, there will be a slight restriction to the flow of strong solution therethrough. This results in a raising of the level of the strong solution within line 23. At such time as the solution reaches limited capacity line 50 and causes some flow therethrough, valve 41 is actuated towards its closing position by control 56 under the influence of bulb 59, which is in a position to sense the elevated temperature of the mixture of cool solution within U-tube 51 and the hot solution. This has the effect of lowering the concentration of the strong solution, which then has a "washing" effect on the crystals in heat-exchanger 22, tending to dissolve them. Should crystallization continue, the liquid level of the hot solution within line 23 continues to rise, causing greater pressure differential across the restrictors 53 with increased hot solution flow. This causes a higher temperature at bulb 59. A further rise in the liquid level causes flow into limited capacity line 52. The additional hot solution mixing with the previous mixture of cool and hot solution within U-tube 51, serves to elevate the temperature still higher. This results in a further throttling of valve 41, further acting to reduce system capacity to further reduce the concentration of the strong solution, so that it will be able to dissolve still more crystals in its passage through heat-exchanger 22. It will be apparent that the flow of hot solution through overflow line 52 could be utilized to actuate any desired control. With still more crystallization within heat-exchanger 22, the liquid level rises to a point wherein hot solution flows directly into bypass line 48, whence it flows directly to absorber shell 16, mixing with the diluted absorber solution on the bottom of the shell and raising the temperature thereof. In addition to the "washing" action of the strong solution passing through heat-exchanger 22, pump 33 serves to forward this higher temperature solution on the bottom of shell 16 through the tubes of heat-exchanger 22. It will be appreciated that, with a continual supply of hot solution to shell 16 through bypass 48, the temperature of the solution forwarded by pump 33 to heat-exchanger 22 will continually rise. The elevated temperature acts to dissolve the crystals on the shell side of the heat-exchanger, removing the impediment to the flow of strong solution therethrough. At such time as this happens, the system operates normally and the height of solution within line 23 is lowered to its normal operating point. In addition, flow through bypass line 48 permits the system to remain in operation, even though flow through heat-exchanger 22 is substantially impeded.

In addition, bulb 68 and control T may be provided to decrystallize heat-exchanger 22 in the event the same becomes totally crystallized in spite of the various steps previously taken. Control T is of a timed nature; that is, should hot solution flow through bypass line 48, the increased pressure within bulb 68 would be transmitted to control T by way of capillary 69 to actuate the same. After a suitable period of time, say 45 minutes, control T would permit the increased pressure to be transmitted to valve 70 controlling the flow of cooling water through absorber 21. It will be apparent that this will occur only if, at the end of the 45-minute interval, hot solution is still being bypassed through line 48, maintaining the increased pressure within bulb 68. This would indicate a completely crystallized condition of heat-exchanger 22. In this event, valve 70 would be actuated to its closed position and absorber 21 would discontinue functioning. The solution at the bottom of shell 16 would very quickly reach the temperature of the heated strong solution flowing through bypass line 48, since there would be no cooling effect within the absorber. This temperature would then be sufficiently elevated to decrystallize heat-exchanger 22 in the passage of the hot solution therethrough. Alternatively, control T could be used to actuate a flow of steam through steam chase lines (not shown) directly within heat-exchanger 22 in order to decrystallize the same.

It will be apparent that line 48 may be provided at any desired height above solution level 24 within line 23 to bypass hot, strong solution directly to shell 16. It will further be appreciated that any number of limited capacity overflow lines may be provided as is desirable, or none may be provided at all, relying solely on bypass line 48 to continue the apparatus in operation and to decrystallize heat-exchanger 22 when crystallization occurs. Further, any combination of the various controls shown or permutation may be embodied in an operative system; the invention envisions any of these.

It will be seen that I have provided an extremely flexible method of preventing crystallization in the heat-exchanger of a refrigerating absorption system, decrystallizing the heat-exchanger in the event of crystallization while maintaining the apparatus in operation. Merely by locating the bypass line 48 at varying heights above the normal level of liquid within line 23, I can provide for decrystallization at varying degrees of the clogging of heat-exchanger 22. Further, by providing limited capacity overflow lines at a height intermediate level 24 and the intersection of line 48 with line 23, I can control the capacity of the machine in various steps and stages in order to prevent crystallization.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. In an absorption refrigerating system including a generator, an absorber, a heat-exchanger for exchanging heat between strong absorbent solution flowing from the generator to the absorber and weak absorbent solution flowing from the absorber to the generator, a hot, strong solution line between the generator and the heat-exchanger, a cool, strong solution line from the heat-exchanger to the absorber and a weak solution line from the absorber to the generator, said line passing through said heat-exchanger; the improvement comprising means for bypassing strong solution around said heat-exchanger when the flow of strong solution therethrough is impeded; and control means responsive to the flow of bypassed strong solution.

2. In the absorption system as set out in claim 1, a line for supplying cooling fluid to said absorber and including valve means therein; a line for supplying a heated fluid to said generator and including valve means therein; said control means actuating at least one of said valve means on said flow of bypassed solution.

3. In the absorption system as set out in claim 1, a condenser; a line for supplying cooling fluid to said condenser; a line for supplying cooling fluid to said absorber; a line for supplying heated fluid to said generator; valve means in one of said aforementioned three lines; and control means actuating said valve means on said flow of bypassed solution.

4. In an absorption refrigerating system including a generator and an absorber; a strong solution line between the generator and the absorber, said line being sized to maintain a predetermined level of solution therein and open sewer flow above said predetermined level; a weak solution line from the absorber to the generator, said strong solution line and said weak solution line being in heat-exchange relation along a portion of their length; a bypass line leading from said strong solution line to said absorber, said line intersecting said strong solution line at a selected height above said aforementioned predetermined solution level, and control means responsive to the flow of solution through said bypass line.

5. In the absorption system of claim 4, a condenser; a line for supplying cooling fluid to said condenser; a line for supplying cooling fluid to said absorber; a line for supplying heated fluid to said generator; valve means in one of said aforementioned three lines; said control means being responsive to the flow of solution through said bypass line for actuating said valve means.

6. In an absorption refrigerating system including a generator and an absorber; a strong solution line between the generator and the absorber, said line being sized to maintain a predetermined level of solution therein and open sewer flow above said predetermined level; a weak solution line from the absorber to the generator; said strong solution line and said weak solution line being in heat-exchange relation along a portion of their lengths; an overflow line leading from said strong solution line, said line intersecting said strong solution line at a selected height above said aforementioned predetermined solution level; and control means responsive to flow of solution through said overflow line.

7. In the absorption system as set out in claim 6, a line for supplying heated fluid to the generator, and valve means in said heated fluid line controlling the flow of fluid therethrough, said control means actuating said valve means on flow of solution through said overflow line.

8. In an absorption refrigerating system including a generator and an absorber; a strong solution line between the generator and the absorber, said line being sized to maintain a predetermined level of solution therein and open sewer flow above said predetermined level; a weak solution line from the absorber to the generator, said strong solution line and said weak solution line being in heat-exchange relation along a portion of their length; a bypass line leading from said strong solution line to said absorber, said line intersecting said strong solution line at a selected height above said aforementioned predetermined solution level; an overflow line connected to said strong solution line at a point intermediate said bypass line and said predetermined level of solution therein; and control means responsive to solution flow through said overflow line.

9. In an absorption system as set out in claim 8, control means responsive to flow of solution through said bypass line.

10. In an absorption refrigerating system including a generator, an absorber, and a heat-exchanger for exchanging heat between strong absorbent solution flowing from the generator to the absorber and weak absorbent solution flowing from the absorber to the generator; a hot, strong solution line between the generator and the heat-exchanger, said line being sized to maintain a predetermined level of solution therein and open sewer above said predetermined level; a cool, strong solution line from the heat-exchanger to the absorber; a weak solution line from the absorber to the generator, said line passing through said heat-exchanger; a bypass line leading from said hot, strong solution line, at a point above said predetermined level, and control means responsive to the flow of solution through said bypass line.

11. In the absorption system of claim 10, a condenser; a line for supplying cooling fluid to said condenser; a line for supplying cooling fluid to said absorber; a line for supplying heated fluid to said generator; valve means in one of said aforementioned three lines; said control means being responsive to the flow of strong solution through said bypass line for actuating said valve means.

12. In an absorption refrigerating system including a generator, an absorber, and a heat-exchanger for exchanging heat between strong absorber solution flowing from the generator to the absorber and weak absorbent solution flowing from the absorber to the generator; a hot, strong solution line between the generator and the heat-exchanger, said line being sized to maintain a predetermined level of solution therein and open sewer flow above said predetermined level; a cool, strong solution line from the heat-exchanger to the absorber; a weak solution line from the absorber to the generator, said line passing through said heat-exchanger; a limited capacity overflow line connected to said hot, strong solution line at a preselected height above said aforementioned predetermined solution level, whereby, when flow from said generator through said heat-exchanger is impeded, solution will back up in said hot, strong solution line and flow through said overflow line, and control means actuated by flow of strong solution through said overflow line.

13. In an absorption refrigerating system including a generator, an absorber, and a heat-exchanger for exchanging heat between strong absorber solution flowing from the generator to the absorber and weak absorbent solution flowing from the absorber to the generator; a hot, strong solution line between the generator and the heat-exchanger, said line being sized to maintain a predetermined level of solution therein and open sewer flow above said predetermined level; a cool, strong solution line from the heat-exchanger to the absorber; a weak solution line from the absorber to the generator, said line passing through said heat-exchanger; a bypass line leading from said hot, strong solution line to said absorber, said line intersecting said hot, strong solution line at a selected height above said aforementioned predetermined solution level; an overflow line connected to said hot, strong solution line at a point intermediate said bypass line and said predetermined level of solution therein; and control means responsive to solution flow through said overflow line.

14. In an absorption system as set out in claim 13, a line for supplying heated fluid to said generator including valve means therein, said control means actuating said valve means on flow of solution through said overflow line.

15. In an absorption system as set out in claim 14, a line for supplying cooling fluid to said absorber; a condenser; a line for supplying cooling fluid to said condenser; valve means in one of said two just-mentioned lines; and control means for actuating said valve means on flow of solution through said bypass line.

16. In an absorption system as set out in claim 13, control means responsive to flow of solution through said bypass line.

17. In an absorption refrigeration system including a generator, an absorber, a condenser and an evaporator connected in closed circuit relation, a heat-exchanger for exchanging heat between strong absorbent solution flowing from the generator to the absorber and weak absorbent solution flowing from the absorber to the generator, a strong solution line between the generator, and the heat-exchanger, a strong solution line from the heat-exchanger to the absorber, and a weak solution line from the absorber to the generator, said line passing through said heat-exchanger; means for bypassing strong solution around said heat-exchanger when the flow of strong solution therethrough is impeded, said means comprising a line interconnecting said strong solution line with said absorber, said bypass line joining said strong solution line at a point substantially below the normal solution level in said generator and above the normal solution level in said strong solution line, whereby upon obstruction of flow through said heat exchanger said solution will bypass before the solution level in said strong solution line reaches the solution level in said generator, and control means responsive to the flow of bypassed strong solution.

18. Apparatus as defined in claim 17, wherein said strong solution line between said generator and said heat-exchanger comprises a substantially vertical conduit having an upper end into which solution from said generator flows in open sewer-flow relation, and a lower end above said heat exchanger in which a solution level exists during normal operations, said bypass line joining said strong solution line at a point just above said solution level in said lower end.

References Cited

UNITED STATES PATENTS

| | | | |
|---|---|---|---|
| 2,430,047 | 11/1947 | Edberg | 62—494 X |
| 2,670,608 | 3/1954 | Hainsworth | 62—148 |
| 2,749,095 | 6/1956 | Anderson et al. | 62—485 X |
| 2,814,468 | 11/1957 | Berry | 62—487 X |
| 2,818,234 | 12/1957 | Berry | 62—487 X |
| 2,986,906 | 6/1961 | Stubblefield et al. | 62—487 |
| 3,053,056 | 9/1962 | Leonard | 62—148 X |

LLOYD L. KING, *Primary Examiner.*